G. CORAY.
FOLDING COT.
APPLICATION FILED MAY 24, 1920.
1,367,465.
Patented Feb. 1, 1921.
2 SHEETS—SHEET 2.
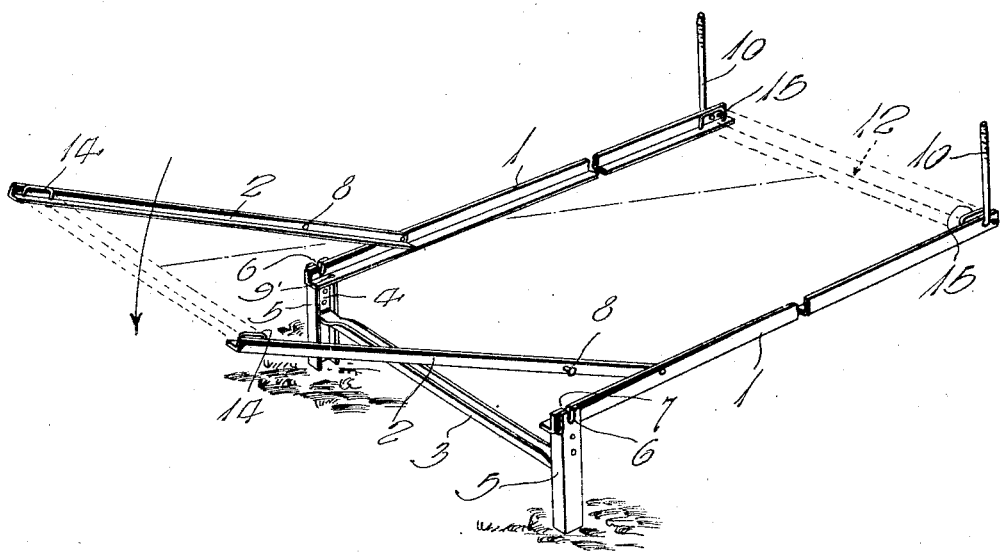
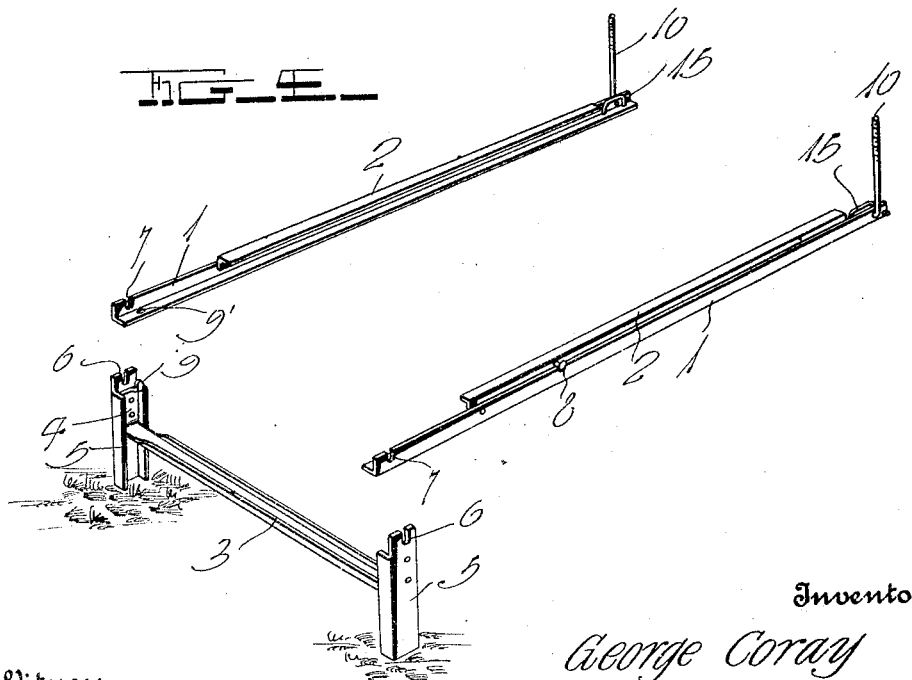
Witness
H. Woodard
Inventor
George Coray
By H.R. Wilson &co
Attorneys.

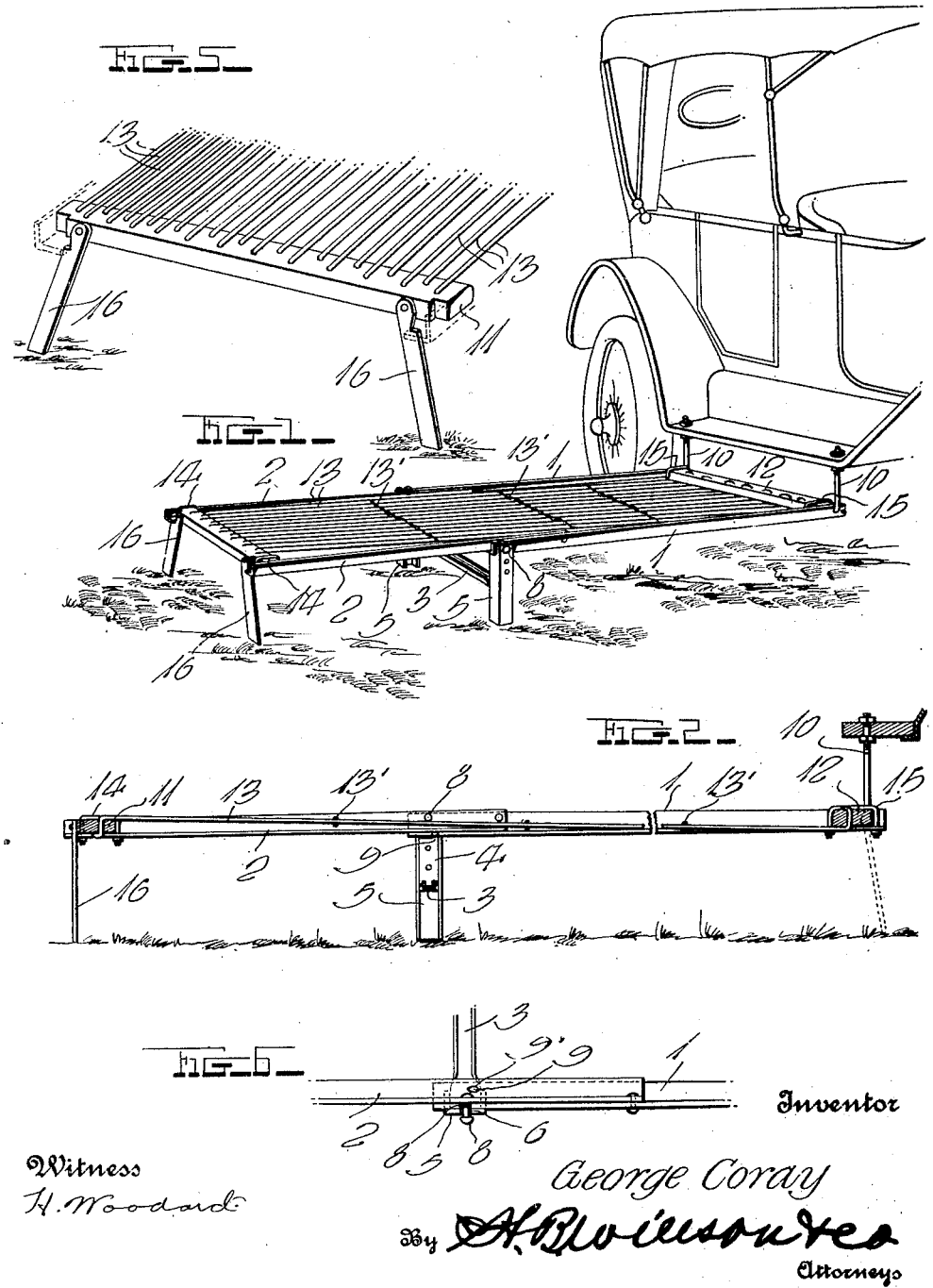

UNITED STATES PATENT OFFICE.

GEORGE CORAY, OF SALT LAKE CITY, UTAH.

FOLDING COT.

1,367,465.  Specification of Letters Patent.  Patented Feb. 1, 1921.

Application filed May 24, 1920. Serial No. 383,820.

*To all whom it may concern:*

Be it known that I, GEORGE CORAY, a citizen of the United States, residing at Salt Lake City, in the county of Salt Lake and State of Utah, have invented certain new and useful Improvements in Folding Cots; and I do declare the following to be a full, clear, and exact description of the invention, such as will enable others skilled in the art to which it appertains to make and use the same.

This invention relates to an improved folding cot for use principally in connection with an automobile and one object of the invention is to provide a folding cot which can be easily and quickly folded or set up and which will be so constructed that it may be connected with the step or running board of the automobile.

Another object of the invention is to so construct this cot that it may be connected with the step of the automobile or if so desired may be set up in a tent, the means for connecting one end of the cot with the automobile step serving as supporting means for that end of the cot when the cot is set up in a tent.

Another object of the invention is to so construct this cot that it may be taken apart and the various elements then rolled up into a compact bundle which can be stored away in a comparatively small space.

Another object of the invention is to so construct this cot that there will be no danger of the framework coming apart after being set up.

Another object of the invention is to provide a cot having the framework so constructed that ropes which will form the spring may be stretched tight during the process of setting up the framework.

Another object of the invention is to so construct this cot that the bars which carry the ropes may be securely but releasably held in engagement with the side rails of the cot.

This invention is illustrated in the accompanying drawings wherein:

Figure 1 is a perspective view showing the cot in position for use and connected with the step of an automobile.

Fig. 2 is a longitudinal sectional view through the cot and step of an automobile.

Fig. 3 is a perspective view of the frame of the cot.

Fig. 4 is a perspective view showing the expansible sections of the side rails folded back and the stationary sections of the side rails disconnected from the supporting yoke which supports the cot at a point intermediate its length.

Fig. 5 is a perspective view of one end portion of the spring structure which forms part of this cot.

Fig. 6 is an enlarged top plan view showing the manner of connecting the side rails with the vertical arms or standards of the supporting yoke.

This cot is for use principally by persons traveling in an automobile and is so constructed that if the person traveling should not be able to reach a town where hotel accommodations may be had the cot may be set up as shown in Fig. 1 and connected with the step of the automobile. It will thus be seen that the cot may be connected with the automobile and therefore the automobile cannot be very easily stolen as the automobile cannot be driven away without first disconnecting the cot and this would permit one end portion of the cot to drop. This cot is provided with side rails each of which has a stationary section 1 and a movable or extensible section 2 which will pivotally connect with the stationary section in spaced relation to one end of the stationary section and thus permit the extensible section to be swung from the folding position shown in Fig. 4 to the extended position shown in Figs. 1 and 2. These extensible sections when in the folded position will have their ends resting upon the inwardly extending side flanges of the stationary sections and when extended they will rest upon the flanges of the stationary sections as shown in Fig. 2 and will thus be prevented from swinging downwardly beyond a desired amount. It should be noted however, that when swung downwardly, the movable sections extend parallel to the stationary sections but are swung past a dead center as shown in Fig. 2 for a purpose to be hereinafter brought out.

In order to support the cot at a point intermediate its length there has been provided a supporting yoke which is shown in detail in Fig. 4. From an inspection of this figure it will be seen that the yoke is provided with a cross-bar 3 formed of angle-iron and having its side flange adjacent its ends flattened thus providing tongues 4 which will be bent upwardly and secured to the inner faces of the standards or supporting arms 5. These standards are also formed of angle-iron and will be provided at their upper ends with notches 6 adapted to register with the notches 7 of the side rails 1 when the rails are resting upon the shoulders of the standards 5 as shown in Fig. 3. When in this position the side pins 8 which extend from the side rails will pass through these registering notches and the supporting yoke thus held against movement transversely of the cot. It is desired to prevent the yoke from having movement longitudinally of the cot and therefore the sections 1 of the side rails are provided with openings 9' to receive the pins 9 of the tongues 4 as shown in Fig. 6. This further permits the cot to be very easily and quickly set up since it is simply necessary to rest the ends of the rail sections 1 upon the shoulders of the standards 5 with the pins 9 passing through the openings 9' and the notches 6 and 7 will be then properly positioned to register.

When this cot is in use the bolts 10 which are loosely connected with the end portions of the upstanding portions of the flanges of the rail sections 1 will be passed through openings in the step of the automobile and the securing nuts put in place as shown in Fig. 1. Of course if the cot is to be used in a tent the bolts will be swung downwardly instead of upwardly and will thus provide supports which engage the ground as indicated in dotted lines in Fig. 2. The yoke will be put in place as shown with the end portions of the rail sections 1 resting upon the upper ends of the tongues 4 and the spring will then be put in place. This spring is provided with end bars 11 and 12 which are provided with openings through which will be passed the ends of ropes 13. This may be a single length of rope which will be threaded back and forth between the bars and passed through the openings of the two bars or each strand may be a separate piece of rope so that in case one should become broken a new one may be easily and quickly put in place. The end bars 11 and 12 extend transversely between the side rails with the end bar 11 positioned between the outer end portions of the sections 2 and releasably held in place by the U-shaped clamps 14 and the cross-bar 12 positioned between the outer end portions of the rail sections 1 and releasably held in place by the U-shaped clamps 15. The strands of rope 13 will be of such length that the extensible rail sections may be swung to the position shown in Fig. 3 and suspended in this position by the strands of rope. These strands of rope have sufficient give to them so that the extensible sections of the rails may be forced downwardly to the position shown in Figs. 1 and 2 with the extensible sections passing the dead center and the pins 8 fitting into the registering notches 6 and 7. It will thus be seen that the strands of rope which are braced by cross strands 13' and form the spring will be drawn very tight and will be held in the stretched condition to provide the spring action desired. The foldable legs 16 which are pivotally connected with the cross-bar 11 can then be swung downwardly until stopped by engagement with the rails 2 and will engage the ground and support this end of the cot. The cot will then be ready for use.

When it is desired to refold the cot it is simply necessary to fold the legs 16 upwardly against the cross-bar 11 and then swing the extensible side sections of the rails upwardly past the dead center. The yoke can then be removed from the inner end portions of the stationary sections 1 and the clamps 14 and 15 loosened to release the cross bars 11 and 12. The spring structure will then be removed and the extensible sections of the side rails folded down to the folded position shown in Fig. 4 after which the bolts 10 will be released from the step of the automobile and folded downwardly to extend along the outer faces of the side rails. The two side rails can then be placed together and the side rails and yoke extended across the ropes 13 adjacent to and extending longitudinally of one of the cross-bars 11. The collected structure can then be rolled into a bundle with the ropes serving as a binding medium and after the ropes have been wound around the bundle a suitable strap may be put in place to retain the bundle in its rolled condition. It will thus be seen that there has been provided a cot which will be very convenient for use by traveling salesmen who cover rural districts and which would also be very convenient for use by persons traveling through scarcely settled territories where it would not be possible to always reach a town having a suitable hotel before night.

What is claimed is:

1. A folding cot comprising side rails each having a stationary section and an extensible section pivotally connected with the stationary section adjacent to but spaced from the inner end thereof, a supporting yoke extending transversely of the cot at a point intermediate its length and provided with upstanding standards having notches at their upper ends for registering with notches in the inner end portions of the stationary rail sections, side pins extending from the inner end portions of the movable rail sections for fitting into the registering notches when the movable sections are swung downwardly, a spring structure including end bars extending between the side rails with one end bar releasably connected with the outer ends of the stationary rail sections and the second bar releasably connected with the outer ends of the movable rail sections, supporting legs pivotally connected with one of the end bars, and supporting bolts pivotally connected with the outer end portions of the stationary rail sections for engaging the ground and for connecting the cot with the step of an automobile.

2. A folding cot comprising side rails having stationary sections and extensible sections movably connected with the stationary sections, a supporting yoke extending transversely beneath the cot adjacent the inner ends of the stationary rail sections and having vertical standards and a cross bar extending between the standards and having end tongues connected with the standards, means carried by the movable sections of the rails to engage the stationary sections and standards to retain the standards in a set position, and a spring structure releasably connected with the side rails.

3. A folding cot comprising side rails each having a stationary section and an extensible section pivotally connected with the stationary section adjacent to but spaced from the inner end thereof, supporting means for the cot including upstanding standards having notches at their upper ends for registering with notches in the inner end portions of the stationary rail sections, side pins extending from the inner end portions of the movable rail sections for fitting into the registering notches when the movable sections are swung downwardly and a spring structure including end bars extending between the side rails with one end bar releasably connected with the outer ends of the stationary rail sections and the second bar releasably connected with the outer ends of the movable rail sections.

4. A folding cot comprising side rails having stationary sections and extensible sections pivotally connected with the stationary sections adjacent to but spaced from the inner ends thereof, supporting standards positioned beneath the cot adjacent the inner ends of the stationary rail sections and having notches registering with notches formed therein, means carried by the movable sections of the rails for fitting into the registering notches of the stationary sections and standards to retain the standards in a set position, and a spring structure releasably connected with the side rails.

In testimony whereof I have hereunto set my hand.

GEORGE CORAY.